Feb. 4, 1936.　　　　H. DAWSON　　　　2,029,656
BARREL TRUCK
Filed Oct. 20, 1934　　　2 Sheets-Sheet 1
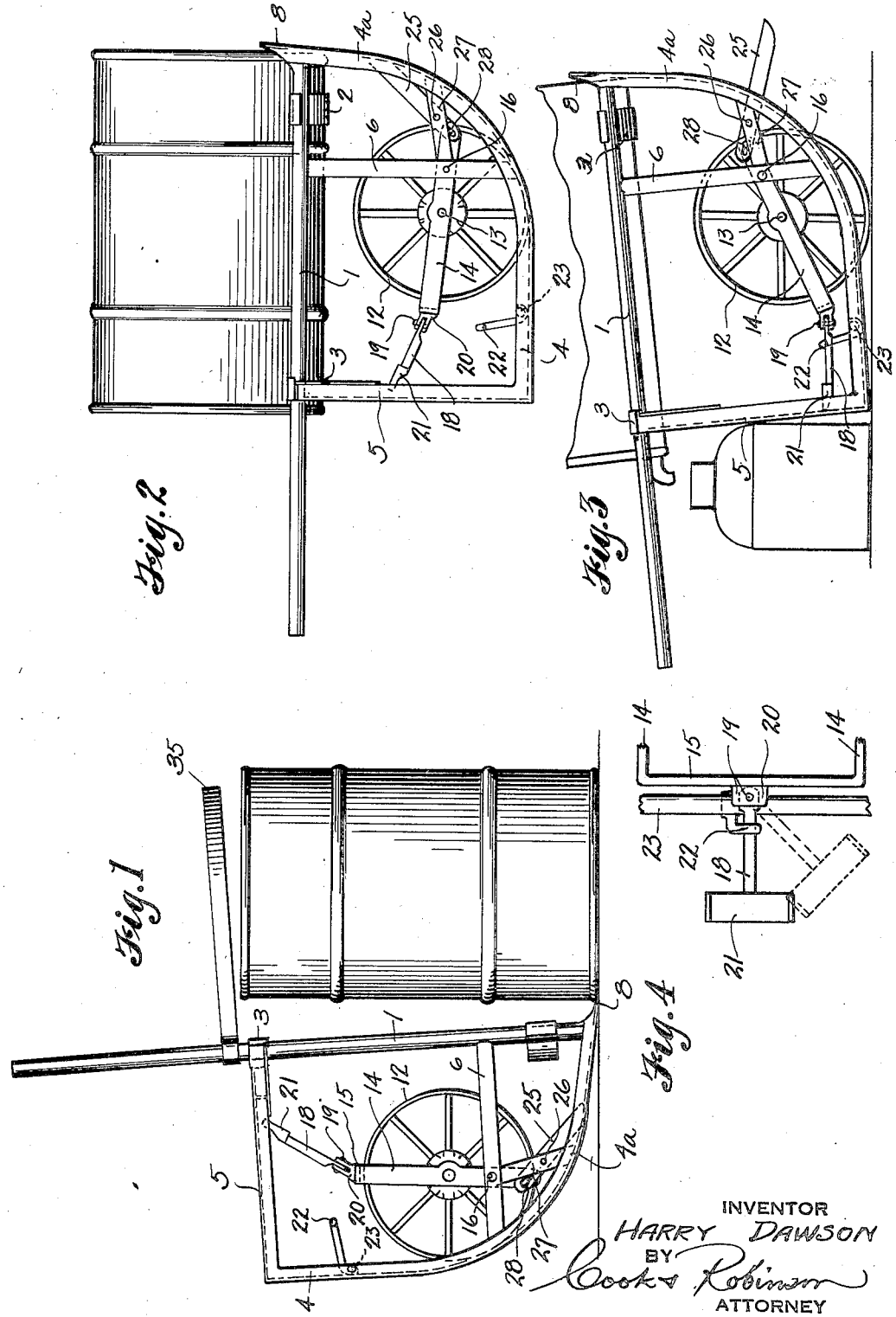
INVENTOR
HARRY DAWSON
BY
Cook Robinson
ATTORNEY Feb. 4, 1936.  H. DAWSON  2,029,656
BARREL TRUCK
Filed Oct. 20, 1934  2 Sheets-Sheet 2
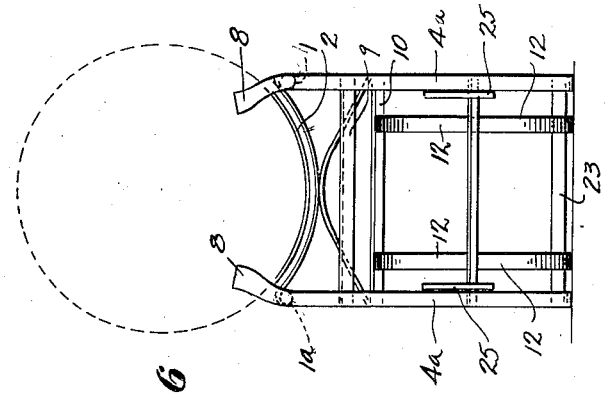
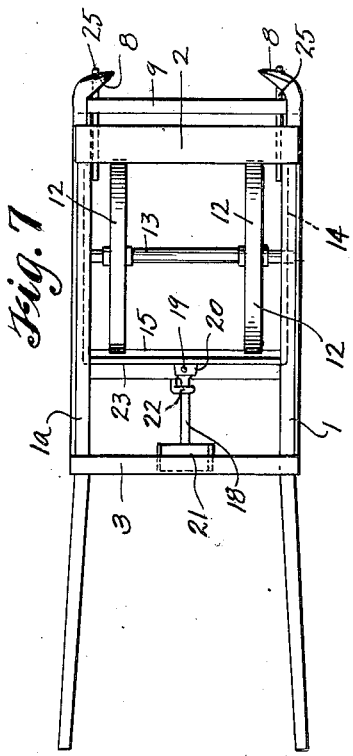
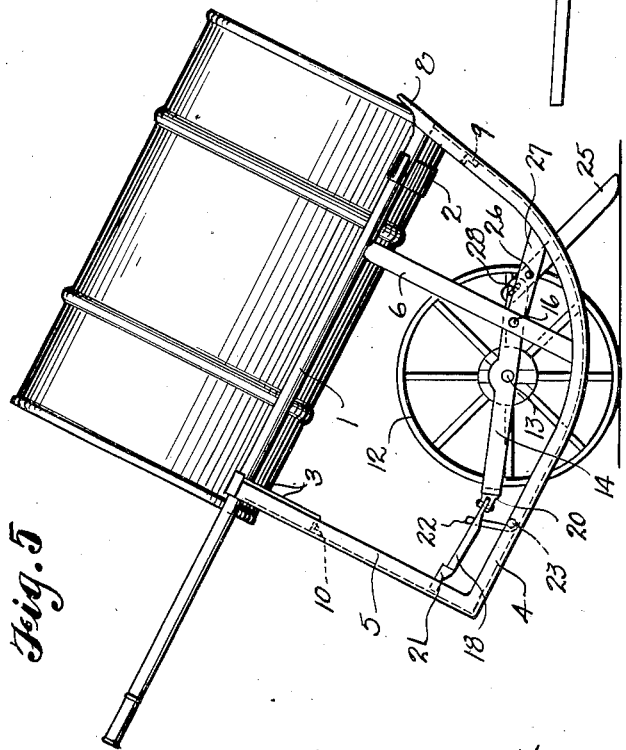
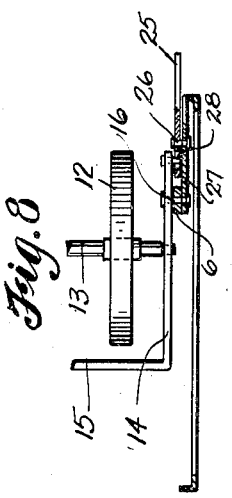
INVENTOR
HARRY DAWSON
BY
Cook + Robinson
ATTORNEY Patented Feb. 4, 1936

2,029,656

UNITED STATES PATENT OFFICE 2,029,656

BARREL TRUCK

Harry Dawson, Everett, Wash.

Application October 20, 1934, Serial No. 749,225

2 Claims. (Cl. 280—53)

This invention relates to improvements in trucking devices, and it has reference more particularly to hand trucks of a type for the handling of barrels and especially those from which a liquid content is to be dispensed, such as those now commonly used for oil; it being the principal object of this invention to provide an improved form of hand truck, equipped with rockers for aiding in a quick, easy and practical loading of barrels onto or from the truck and having wheels arranged to be brought from an inactive position into a position for lifting the truck and to support the rockers clear and free of the ground for transportation of the load.

Another object of the invention resides in the provision of means for mounting the wheels and for bringing them into load carrying position.

Other objects of the invention reside in the details of construction, in the combination of parts and in their mode of operation as will hereinafter be described.

In accomplishing these and other objects of the invention, I have provided the improved details of construction, the preferred forms of which are illustrated in the accompanying drawings, wherein—

Fig. 1 is a view showing, in side elevation, the truck when tilted on the rockers to a position for loading a barrel.

Fig. 2 is a view showing the barrel loaded onto the truck.

Fig. 3 is a side view of the truck with the wheels adjusted to position for carrying the load and for dispensing contents from the barrel.

Fig. 4 is a detail, showing in plan view, the wheel adjusting and locking means.

Fig. 5 is a view of the truck showing dogs in safety position.

Fig. 6 is an end view of the truck.

Fig. 7 is a plan view of the same.

Fig. 8 is a detail particularly illustrating the connection of the supporting dogs with the wheel frame.

The present invention is thought to be differentiated from rocker type of hand trucks now on the market, by reason of the wheel being arranged to be disposed in position either for direct support of the truck for transportation or movable to a position for causing the truck rockers to engage the ground. Also in the specific means for effecting this adjustment of the wheels.

Referring more in detail to the drawings—

In a preferred form of construction, the truck comprises a main frame structure having a pair of substantially parallel opposite side bars 1 and 1a, that are joined rigidly in spaced relation across their forward portions by cross plates 2 and 3 spaced properly for supporting a barrel thereon; these plates being downwardly bowed to conform to the curvature of the sides of the barrel for which the truck is intended. The rearward end portions of the bars 1 and 1a are extended sufficiently beyond the cross plate 3 that they may be used conveniently as handles for lifting and moving the truck.

Mounted at each side of the frame structure, at the forward ends of the side bars 1 and 1a are rockers, each rocker comprising a base bar 4 that is joined with its corresponding side bar at its rearward end and at a forward point, respectively, by upright legs 5 and 6. The forward portion of each of the base bars 4 is curved gradually upwardly and is joined at its upper end to the forward end of its corresponding side bar, thus to form the two spaced and symmetrically curved rockers on which the truck may rock from a substantially upright loading position, as illustrated in Fig. 1, to the horizontal and carrying position of Fig. 2, or vice versa. The rocker ends extend somewhat beyond the side bars and are flattened and shaped to form the loading feet 8—8. The two rocker frames are joined by transverse braces 9 and 10 to supplement the plates 2 and 3 to give rigidity and strength to the structure.

Located between the rocker frames is a pair of truck wheels 12—12 that are fixed in spaced relation on a transverse axle 13 which at its opposite ends is journaled in the opposite side members 14—14 of the wheel frame. The wheel frame comprises the said side members 14—14, and a transverse bar 15 connecting them across their rearward end portions. The forward end portions of the members 14—14 are pivotally attached, as at 16, to the uprights 6 at opposite sides of the truck frame so that the wheel frame may swing upwardly within the truck frame thereby to clear the wheels of the ground and permit the rockers to rest on the ground, or it may be swung downwardly to bring the wheels into load supporting position and to lift the rockers off the ground, as shown in Figs. 3 and 4.

The means provided for moving the wheel frame to the position at which the wheels will support the load and whereby the rockers will be lifted clear of the ground, comprises a foot lever 18, that is pivotally attached at its forward end by a pivot 19 to a lug 20 that is fixed centrally on the cross bar 15 of the wheel frame so that the lever 18 be swung laterally but will be held rigidly against upward or downward movement relative to the wheel frame. At its rearward end, the lever 18 is provided with a foot plate 21 on which the operator may place his foot and press downwardly, thereby to swing the rearward end of the wheel frame downwardly to actuate it pivotally about the supporting axle for the wheels and by reason of its connection at pivots 16 with the rocker frames to lift the latter from the ground. After the wheel frame has thus been depressed, the lever 18 may be swung to a position for locking it beneath a hook 22 that is fixed to a cross rod 23 extending transversely between the base bars of the rocker frames. When the lever 18 is thus located beneath the hook, the wheel frame will be held in this position at which the wheels support the end, and when it is desired to release the wheel frame for lowering the rockers onto the ground, the operator presses downwardly on the foot plate 21 and moves it laterally from the full line position, as seen in Fig. 4, to the dotted line position, thereby disengaging it from the hook and placing it in a position at which, when pressure is relieved from the foot plate, the wheel frame will swing upwardly into the truck frame and the rockers will be lowered onto the ground.

Operating in conjunction with the wheel frame is a pair of dogs 25. These consist of straight bars that are pivotally attached by pivots 26 to members 27 of the rocker frame. At their rearward ends, the dogs have pin and slot connections, as at 28, with the forward end portions of the side bars 14 of the wheel frame; this construction being best illustrated in Figs. 5 and 8. The forward end portions of the dogs are rounded off to points so that they may engage in holding contact with a supporting surface. It will be understood by reference to Figs. 2 and 3 that the arrangement and pivoting of the dogs is such that when the wheel frame is moved to a position at which the wheels support the truck, as seen in Fig. 3, the dogs will swing to a position extending forwardly of the rockers and when the wheel frame is released to permit the rockers to rest upon the ground, the upward swinging of the wheel frame will effect an upward swinging of the dogs to move their forward ends within the limits of the rockers so that they will not contact with the ground when the truck frame is moved on the rockers between loading and transporting positions.

A feature of this arrangement resides in the safety feature of the dogs in that they absolutely prevent any kick back of the truck should the operator swing the truck to upright position. These dogs provide that the barrel or truck can be moved to upright position only when the rockers are on the ground.

As an aid to loading barrels onto the truck, I have provided a loop 35, as seen in Fig. 1, that is attached at its opposite ends to the handle portions of the side bars at points just rearward of the upright members 5. This loop may be placed over the upper end of a barrel in loading so that when the truck frame is swung back upon the rockers, the barrel will be pulled with it. This loop also is an aid in unloading, as is obvious.

Assuming the device to be so constructed, it is used in the following manner:

For loading a barrel onto the truck, the truck is positioned adjacent the barrel and is lifted to the upright position, as seen in Fig. 1. Then the loop 35 is placed over the upper end of the barrel. The operator then pulls rearwardly on the handles, works the loading feet 8 below the lower end of the barrel; then the truck is swung back on the rockers to the horizontal position of Fig. 2, without much effort on the part of the operator. If it is desired then to move the truck from one place to another, the operator lifts the rockers clear of the ground by pressing downwardly on the foot plate 21 of the lever 18 to move it from the position of Fig. 2 and engage it beneath the hook 22, and in so doing to lift the truck frame and to dispose the wheels in load carrying position, as seen in Fig. 3; this action of the wheel frame also swinging the dogs 25 to the extended position of Fig. 3. The operator then lifts the truck by the handles and pushes it to the desired location. It will be observed that in this arrangement the supporting wheels 12 are disposed at a position substantially below the center of gravity of the barrel and therefore practically all weight is relieved from the arms of the operator, and it is only necessary for him to push and guide the truck.

When it is desired to empty contents from the barrel, while it is on the truck, it may be brought to the position of Fig. 3 and supported through the mediacy of the rear ends of the rockers and the wheels in an inclined position, thereby providing that all the contents may be drained from the lower end of the barrel.

A truck of this character may be made of material such as angle iron to give it strength and rigidity, and the cost thereof will be nominal. Also, such trucks may vary in size and proportion of parts in accordance with any particular use.

Having thus described my invention, what I claim as new therein and desire to secure by Letters Patent is—

1. A truck of the character described, comprising a truck frame having a pair of rockers at its forward end on which the truck may rock from a substantially upright position to load carrying position, a wheel frame disposed between the rockers, a pair of wheels mounted in said wheel frame; said frame being pivotally connected at a point eccentric of the wheels to the truck frame, and adjustable from a position at which said wheels are within the limits of the rockers to a position for supporting the truck, and a pair of dogs pivotally mounted in the truck frame and having operative connection with the wheel frame to be moved thereby from a position within the rockers to a position extended forwardly thereof when the wheel frame is in position that the truck may be supported by the wheels.

2. A truck of the character described, comprising a truck frame having a pair of rockers at its forward end on which the truck may be rocked between loading and load carrying positions, a wheel frame disposed between the rockers and having pivotal connection near its forward end therewith, a pair of wheels mounted in said frame rearwardly of its point of connection, means at the rearward end of said wheel frame, whereby it may be depressed to thereby lift the truck frame and rockers clear of the ground for support by said wheels, a pair of dogs pivotally attached to the rockers and having pivotal connection with the wheel frame whereby movement of the latter to position for supporting the load on the wheels causes said dogs to swing from a position within the rocker to an extended position forwardly thereof to cooperate with the wheels as supports for the truck.

HARRY DAWSON.